(12) United States Patent
Juby et al.

(10) Patent No.: US 7,318,894 B2
(45) Date of Patent: Jan. 15, 2008

(54) METHOD AND SYSTEM FOR TREATING WASTEWATER

(76) Inventors: Graham John Gibson Juby, 10540 Talbert Ave., Suite 200 East, Fountain Valley, CA (US) 92708; Heinrich O. Buhr, 10540 Talbert Ave., Suite 200 East, Fountain Valley, CA (US) 92708

( * ) Notice: Subject to any disclaimer, the term of this patent is extended or adjusted under 35 U.S.C. 154(b) by 410 days.

(21) Appl. No.: 10/602,985

(22) Filed: Jun. 24, 2003

(65) Prior Publication Data

US 2005/0006305 A1   Jan. 13, 2005

Related U.S. Application Data

(63) Continuation-in-part of application No. 10/094,033, filed on Mar. 7, 2002, now abandoned, which is a continuation of application No. 09/943,638, filed on Aug. 29, 2001, now abandoned.

(60) Provisional application No. 60/228,959, filed on Aug. 29, 2001.

(51) Int. Cl.
*C02F 3/28* (2006.01)
*C02F 1/44* (2006.01)
*B01D 61/00* (2006.01)

(52) U.S. Cl. ............... 210/603; 210/609; 210/650; 210/652

(58) Field of Classification Search ........... 210/603, 210/609, 649–652, 252, 259, 321.6; 435/262, 435/262.5

See application file for complete search history.

(56) References Cited

U.S. PATENT DOCUMENTS

| | | | | |
|---|---|---|---|---|
| 4,000,065 A | * | 12/1976 | Ladha et al. | 210/652 |
| 4,518,399 A | * | 5/1985 | Croskell et al. | 95/51 |
| 4,725,357 A | * | 2/1988 | Downing et al. | 210/611 |
| 4,765,900 A | * | 8/1988 | Schwoyer et al. | 210/603 |
| 4,781,836 A | * | 11/1988 | Thiele et al. | 210/603 |
| 4,879,041 A | * | 11/1989 | Kurokawa et al. | 210/640 |
| 5,028,336 A | * | 7/1991 | Bartels et al. | 210/639 |
| 5,635,071 A | * | 6/1997 | Al-Samadi | 210/652 |
| 5,746,920 A | * | 5/1998 | Boergardts et al. | 210/611 |
| 6,113,789 A | * | 9/2000 | Burke | 210/609 |
| 6,368,849 B1 | * | 4/2002 | Norddahl | 435/262 |
| 6,500,340 B1 | * | 12/2002 | Burke | 210/601 |

FOREIGN PATENT DOCUMENTS

| | | | |
|---|---|---|---|
| EP | 0970922 | * | 1/2000 |
| JP | 2-207899 A | * | 8/1990 |
| JP | 9-29290 A | * | 2/1997 |
| JP | P2003-200198 A | * | 7/2003 |

* cited by examiner

*Primary Examiner*—Fred G. Prince
(74) *Attorney, Agent, or Firm*—Dennis W. Beech

(57) ABSTRACT

A method and system is disclosed for treating wastewater that utilizes membrane processes, preferably in combination with anaerobic biological treatment, to provide for economical and environmentally superior treatment without high production of biological solids. The process eliminates the need for conventional secondary treatment processes.

17 Claims, 8 Drawing Sheets

PRIOR ART

METHOD AND SYSTEM FOR TREATING WASTEWATER

This application claims the benefit of U.S. Provisional Application No. 60/228,959 filed Aug. 29, 2001 and U.S. application Ser. No. 09/943,638, filed Aug. 29, 2001 which application is abandon. This is a continuation-in-part of U.S. patent application Ser. No. 10/094,033 filed Mar. 7, 2002 now abandoned which is a continuation of U.S. application Ser. No. 09/943,638 that is abandon.

BACKGROUND OF THE INVENTION

This invention relates to a method for treating wastewater that provides for advantages over methods currently known.

With increases in population and industrialization throughout society, the need for fresh water continues to grow. This makes reclamation and reuse of water desirable when economically and technically feasible. Wastewater is an excellent source of water for reclamation and reuse, but the processed water must satisfy quality standards set by government agencies, which vary depending on the desired use. For example, water standards for urban irrigation are more stringent than standards for discharge to receiving waters when the water is not directly reused. As a result of these varying standards, wastewater treatment and water reclamation have historically been as distinctly different combinations of processes.

Conventional wastewater treatment has been generally successful at treating wastewater for discharge to receiving waters. Such facilities typically employ primary treatment methods, such as settling and skimming, followed by secondary treatment methods incorporating aerobic biological treatment, such as trickling filters and activated sludge. However, conventional wastewater treatment is unable to achieve the more stringent water quality standard required for non-potable or potable reuse. In contrast, water reclamation methods successfully achieve reuse water quality standards by adding additional treatment systems onto conventional wastewater treatment trains. In this "add-on" approach, water reclamation projects receive secondary-treated effluent from conventional wastewater treatment facilities and "add-on" tertiary technologies, such as sand or membrane filtration processes, to the treatment train. This approach has been used to supplement, rather than replace, conventional treatment methods.

There are many examples today in which conventional wastewater treatment facilities provide secondary and tertiary treated effluent water reclamation projects. An example is the Water Factory 21 plant in Orange County, Calif. FIG. 1 shows the process schematic of the Water Factory 21 treatment train. Further developments with membrane processes led to the current state-of-art approach for water reclamation, illustrated in FIG. 2. In this method, the processes of lime treatment and tertiary filtration used in the Water Factory 21 plant have been replaced by microfiltration (MF). MF involves use of membranes that serve to separate particles generally in the 0.1 to 10 micron range. MF has been demonstrated to be an excellent pretreatment step to treatment using reverse osmosis (RO). RO involves use of membranes to remove particles as small as ions from a solution. There are now several reclamation facilities that are using the MF/RO approach to water reclamation from secondary-treated wastewater. Other known forms of membrane filtration include ultrafiltration (UF), used to filter particles from a solution of molecular weight greater than about 10,000 daltons, and nanofiltration (NF), used to filter particles from a solution of molecular weight greater than about 1,000 daltons. The similarity between the old generation and the new generation of water reclamation systems is that they all use the "add-on" approach; i.e., wastewater treatment to an acceptable quality, followed by water quality enhancement by adding on processes until the desired final quality is reached.

Though this conventional approach has been generally successful at achieving desired water quality, it presents a number of problems. First, the conventional approach results in a high need for land. Addition of high technology processes to existing stream results in long treatment trains that occupy large land areas. Second, the conventional approach produces high costs associated with the many wastewater treatment facilities that are needed. Also, the conventional approach requires a substantial amount of energy to operate. Finally, the conventional approach leads to production of large quantities of waste biological solids that are expensive and difficult to dispose.

In view of the above, it is apparent that improved methods are needed for treating of wastewater that provides for increased efficiency, leading to increased production of reclaimed water for lower cost. The present invention fulfills this need, and provides further related advantages.

SUMMARY OF THE INVENTION

The present invention resides in a method for treating wastewater including treating wastewater to produce an effluent suitable for membrane filtration, using processes substantially free of aerobic biological treatment, and then treating the effluent using a membrane filtration system to produce a permeate stream consisting essentially of refined water and a waste stream comprising soluble organic matter and inorganic salts. The step of treating the wastewater to produce an effluent suitable for membrane filtration preferably includes conventional primary treatment of the wastewater, such as settling or screening to remove bulk solids from the wastewater.

The membrane filtration system preferably is selected from a microfiltration system, an ultrafiltration system, a nanofiltration system, a reverse osmosis system, or combinations of these. The method preferably includes routing the waste stream through a high-rate anaerobic digestion process, such as an upflow anaerobic sludge blanket system, to stabilize the soluble organic matter and produce a biological gas composed of methane. The permeate produced using the method can be routed to the ocean.

The invention also resides in a method for treating wastewater comprising; directing the wastewater through a screening apparatus to remove suspended solids from the wastewater, to produce a screened effluent; directing the screened effluent through a microfiltration system to produce a microfiltration effluent; directing the microfiltration effluent through a membrane system selected from the group consisting of a reverse osmosis system, a nanofiltration system, an ultrafiltration system, and combinations thereof, to produce a permeate stream consisting essentially of refined water and a waste stream comprising soluble organic matter and inorganic salts; and directing the waste stream through an upflow anaerobic sludge blanket system to stabilize the soluble organic matter and produce biological gas comprising methane.

Other features and advantages of the invention should become apparent from the following description of the preferred method, taken in conjunction with the accompanying drawings, which illustrate, by way of example, the principles of the invention.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 3:
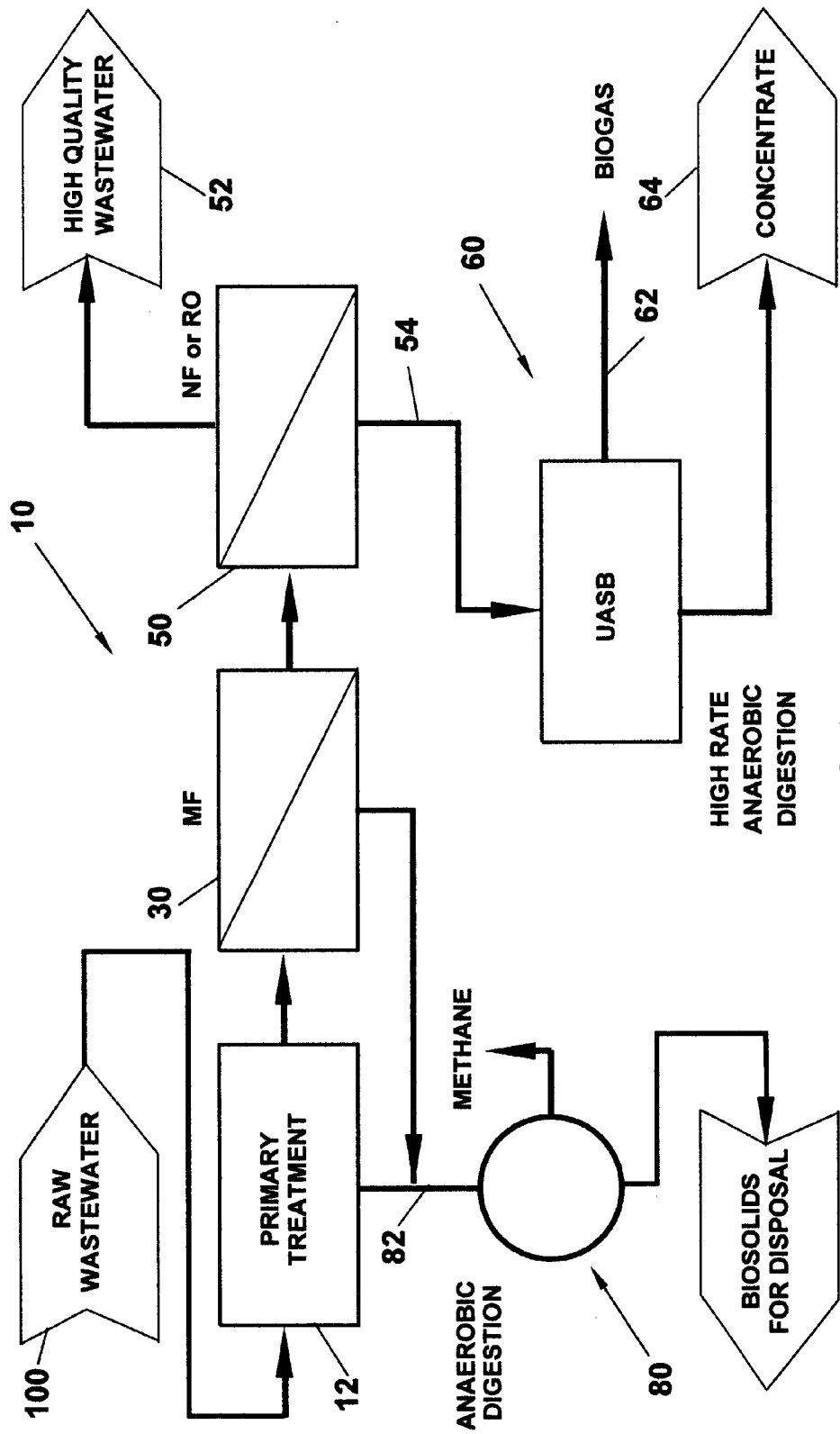
FIG. 3 is a flow diagram of a wastewater treatment process according to an embodiment of the invention.
Figure 8:
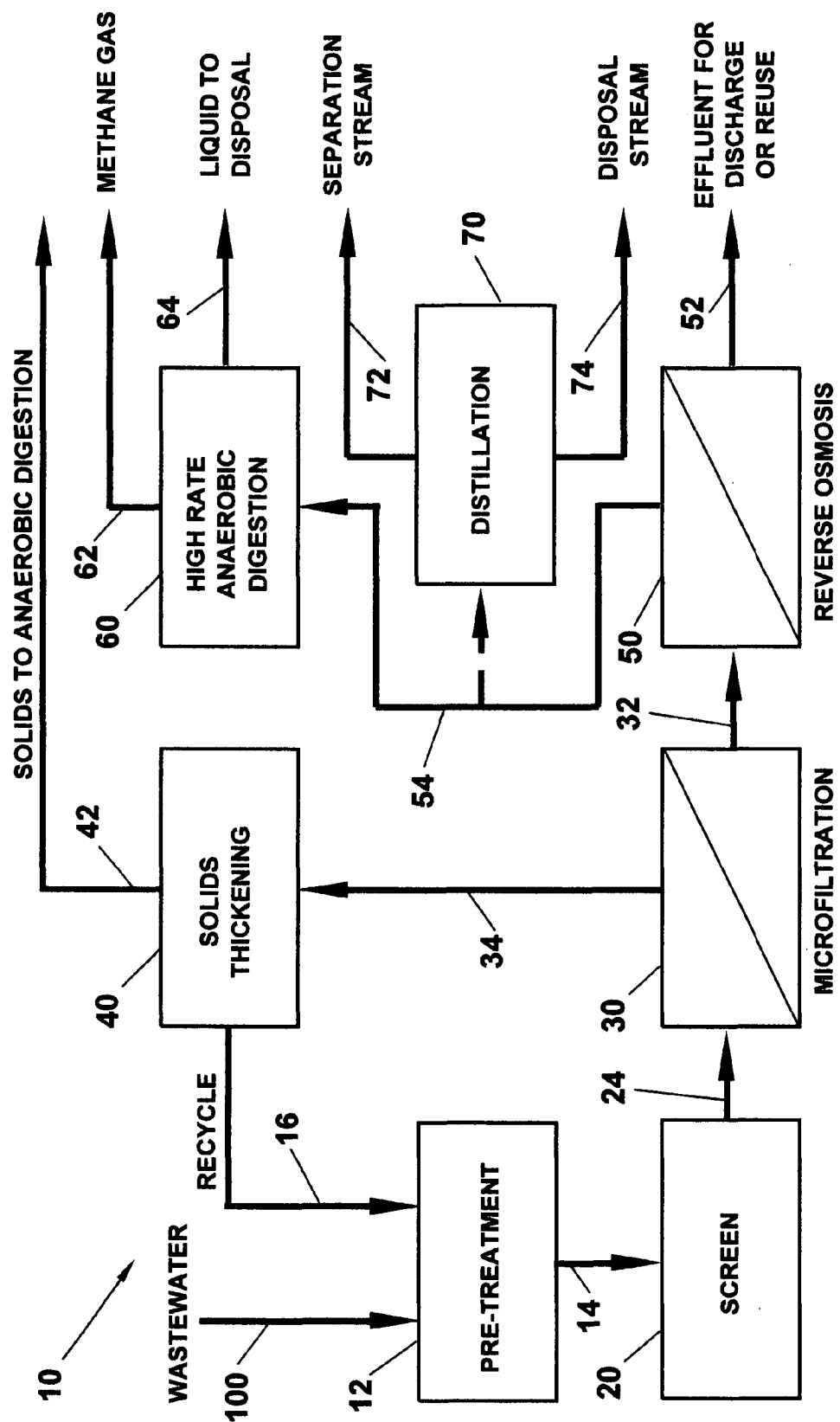
FIG. 8 is a flow diagram of a wastewater treatment process according to an embodiment of the invention.

The present invention resides in a method and system for treating wastewater that utilizes membrane processes, optional in combination with anaerobic biological treatment, to produce high quality water, without utilizing secondary aerobic biological treatment, as is currently considered necessary. The method of the present invention integrates wastewater treatment and water reclamation into a single, economical approach, as illustrated in FIGS. 3 and 8, and it alleviates the problems of current treatment methods identified above.

Wastewater treatment methods previously known have used secondary treatment to reduce levels of soluble organic compounds in the treated stream, resulting in relatively large amounts of solids being produced. It has not been considered feasible to subject membranes, such as those used in microfiltration (MF), to streams having high concentrations of organic compounds and solids generally found in wastewater that has not received secondary treatment. It has been found that it is possible to operate membrane systems with streams containing high concentrations of organic compounds and solids and to use these membrane systems to separate and concentrate organic compounds in wastewater.

The method utilizes a preliminary treatment, such as a settling tank, screens, or other conventional primary treatment, sufficient to produce a preliminary effluent suitable for flow into a membrane filtration unit, preferably a microfiltration (MF) unit. The preliminary effluent flows into the MF unit, which removes essentially all insoluble material from the preliminary effluent. If MF is used, the MF effluent then flows into an additional membrane process for greater purification of the treated stream, such as reverse osmosis (RO), nanofiltration (NF) or ultrafiltration (UF), to produce a waste stream containing concentrated soluble organic compounds (that can be measured by biochemical oxygen demand (BOD)) and a high-quality water effluent suitable for reuse. The waste stream, which is free of suspended material, preferably is treated using a high-rate anaerobic digestion process that eliminates the need for conventional secondary activated sludge treatment and produces biological gas (primarily methane), which can be used for energy production.

The present invention has many advantages over the conventional approach of full secondary wastewater treatment, followed by add-on membrane treatment. The new process combination can have a lower overall power requirement, requires no secondary activated sludge treatment, allows for greater biological gas production and substantially less biological solids production, reducing costs associated with disposal of these solids. The method of the present invention can produce high-quality water equivalent to that produced using conventional methods, while requiring lower capital and operating costs. The method of the present invention addresses the problems of conventional treatments by concentrating the organic constituents of the treated stream into a smaller stream, which can be treated using a low cost high-rate anaerobic biological process. As a result, a significantly smaller quantity of waste solids is produced than when conventional secondary treatment is used, thereby reducing the cost of the treatment plant. In addition, the greater amount of biological gas produced can be used as fuel to reduce the overall energy consumption of the system. Also, because the method of the present invention omits use of secondary treatment facilities and can incorporate use of an integrated membrane system, it allows for a shorter treatment train, reducing land requirements. This allows the method of the present invention to be used in, for example, an on-site treating facility located in a residential area that extracts residential wastewater directly from a sewer, treats it to produce a treated water stream, and then returns the waste stream back into the sewer system.

A flow diagram of a method of the present invention is illustrated in FIG. 3. The first step of the treatment involves using conventional primary settling of the wastewater. This is followed by MF, during which soluble and residual insoluble organic material in the primary effluent are separated. Solid material removed by the MF membranes is returned to anaerobic digesters, which also have received the solids produced during the primary settling step. The MF product stream containing soluble organic material then flows to be treated in an RO process. Besides RO, a NF or UF treatment process also may used. RO unit produces two streams; a permeate stream of high-quality water ready for final disinfection and use, and a concentrate waste stream containing rejected salts and concentrated soluble organic material.

In a method of the present invention, the organic-rich waste stream, which is free of suspended material, is stabilized using a high-rate, that may be approximately an eight hour retention time, anaerobic digestion process. In this process, the organic material in the waste stream is consumed by anaerobic bacteria. Depending on the sulfate concentration in the waste stream, a significant portion of the organic material may be consumed by sulfate-reducing bacteria. Therefore, the product water may contain significantly less sulfate, and the organic constituents may largely have been consumed. As discussed above, a method of the present invention eliminates the need for conventional secondary activated sludge treatment and the associated high volume of solids produced.

Figure 1:
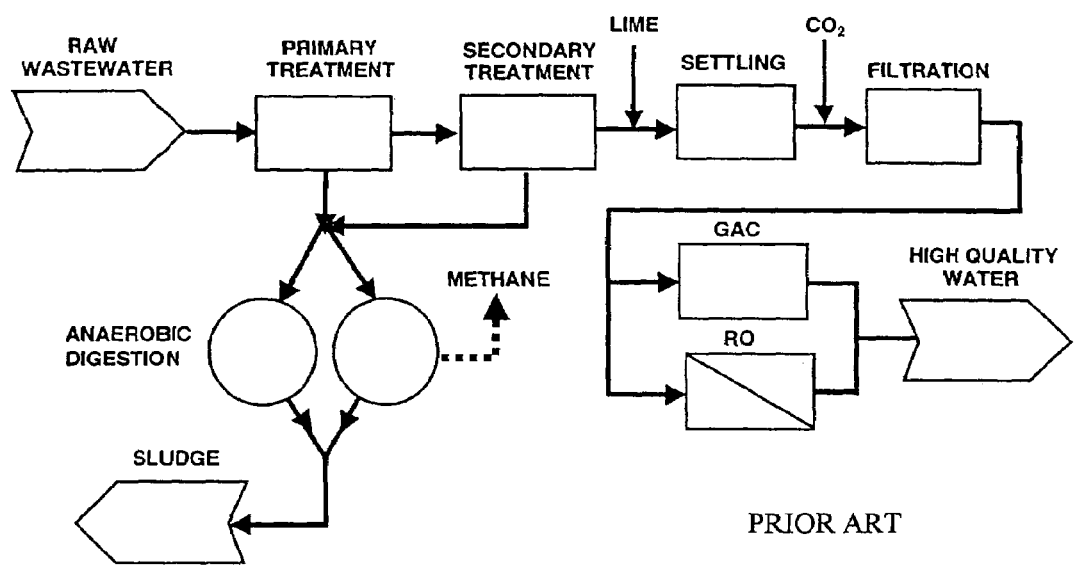
FIG. 1 is a flow diagram depicting the prior art Water Factory 21 treatment process.
Figure 2:
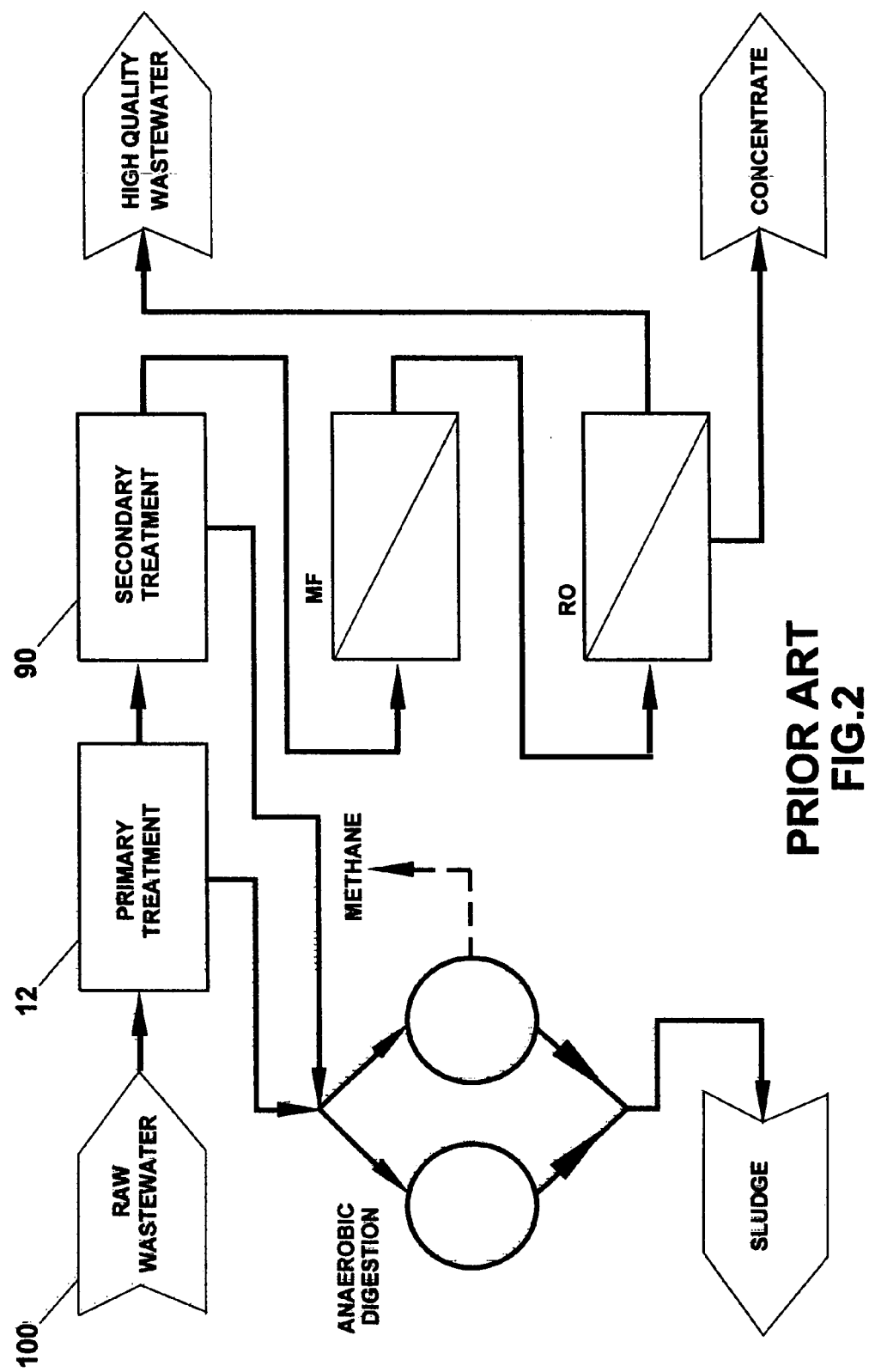
FIG. 2 is a flow diagram depicting a prior art process for wastewater treatment incorporating MF.

Referring to FIGS. 3 and 8, the wastewater treatment system 10 may receive a wastewater influent 100 such as raw sewage that may be from domestic sources, industrial sources or a blend of both that may be received by primary treatment system or a pretreatment system 12. As described previously this pretreatment system 12 may be an existing wastewater treatment facility and may include screening and/or settling to remove the bulk of the large solids from the wastewater stream to less than 5 mm in size. An anaerobic digestion system 80 may be used to further process the primary waste solids 82 communicated from pretreatment system 12. For purposes of the wastewater treatment system 10, any secondary treatment elements 90 that traditionally may have been aerobic biological systems used in conventional wastewater treatment, as best illustrated in FIG. 2, may be removed.

The pretreatment effluent 14 may be communicated to a screen element 20 by conduit or other method for removal of entrained solids, fiber, hair and the like. The screen element 20 may have opening sizes of between approximately 10 and 1,000 microns that may produce a screened effluent 24 suitable for processing by a primary, membrane element 30. The primary membrane element 30 may be a microfiltration process with an approximate pore size in the range of 0.03 to 0.3 microns or may be a membrane in the ultra filtration or nanofiltration range. The effluent fluid 32 from the primary membrane element 30 may be at least 75 percent of the wastewater influent 100 flow rate and may be disposed of or beneficially used. The effluent fluid 32 may be disposed of in the ocean as an example.

The effluent fluid 32 may also be processed in a secondary membrane element 50 for further treatment. The secondary membrane element 50 may be a reverse osmosis, an ultrafiltration or a nanofiltration process. The selection of the process may depend upon the final quality desired in the effluent stream 52. The water recovery levels for effluent stream 52 may depend on the selected secondary membrane element 50 process. The effluent stream 52 may be discharged or beneficially used.

The suspended solids present in the waste stream 34 from the primary membrane element 30 may be thickened in a solids thickening element 40 that may be a flotation process to produce a thickened solids stream 42 output at a concentration of approximately 2.5 to 5.0 percent solids in solids stream 42. The thickened solids stream 42 may be communicated to an anaerobic digestion process to recover energy from the thickened solids stream 42 in the form of methane gas. As part of the solids thickening element 40, a recycle stream 16 may be communicated to pretreatment system 12 for mixing with the wastewater influent 100.

The concentrate effluent stream 54 of secondary membrane element 50 may have greater concentrated dissolved organic material than the effluent fluid 32. The concentrate effluent stream 54 may be disposed of or communicated to a high rate anaerobic digestion system 60 for conversion of the soluble organic matter to energy in the form of methane gas 62. The high rate anaerobic digestion system 60 may have a hydraulic retention time of 16 hours or less. The high rate anaerobic digestion system 60 may, for example, be an up flow anaerobic sludge bed, blanket, reactor or USAB process. The digestion system fluid effluent 64 may be a final waste stream from the wastewater treatment system 10. This stream may be communicated to an evaporation pond or other appropriate disposal alternative.

The concentrate effluent stream 54 may alternatively be disposed of or communicated to a separation process 70 for concentration of dissolved organic compounds and/or ammonia that may be removed from the system as byproducts. The separation process 70 may be, for example, a distillation process or flash evaporation process allowing water vapor, volatile organic compounds and/or ammonia to be separated from the inorganic compounds to produce a separation stream 72 and a more concentrated disposal stream 74 for final disposal. Depending on the separation process 70, the water vapor, volatile organic compounds and ammonia may be present in more than one stream forming separation stream 72 to be compatible with the disposal options for these components. The disposal stream 74 may be a final waste stream from the wastewater system 10 that may be communicated to an evaporation pond or other appropriate disposal alternative.

EXAMPLE

Figure 4:
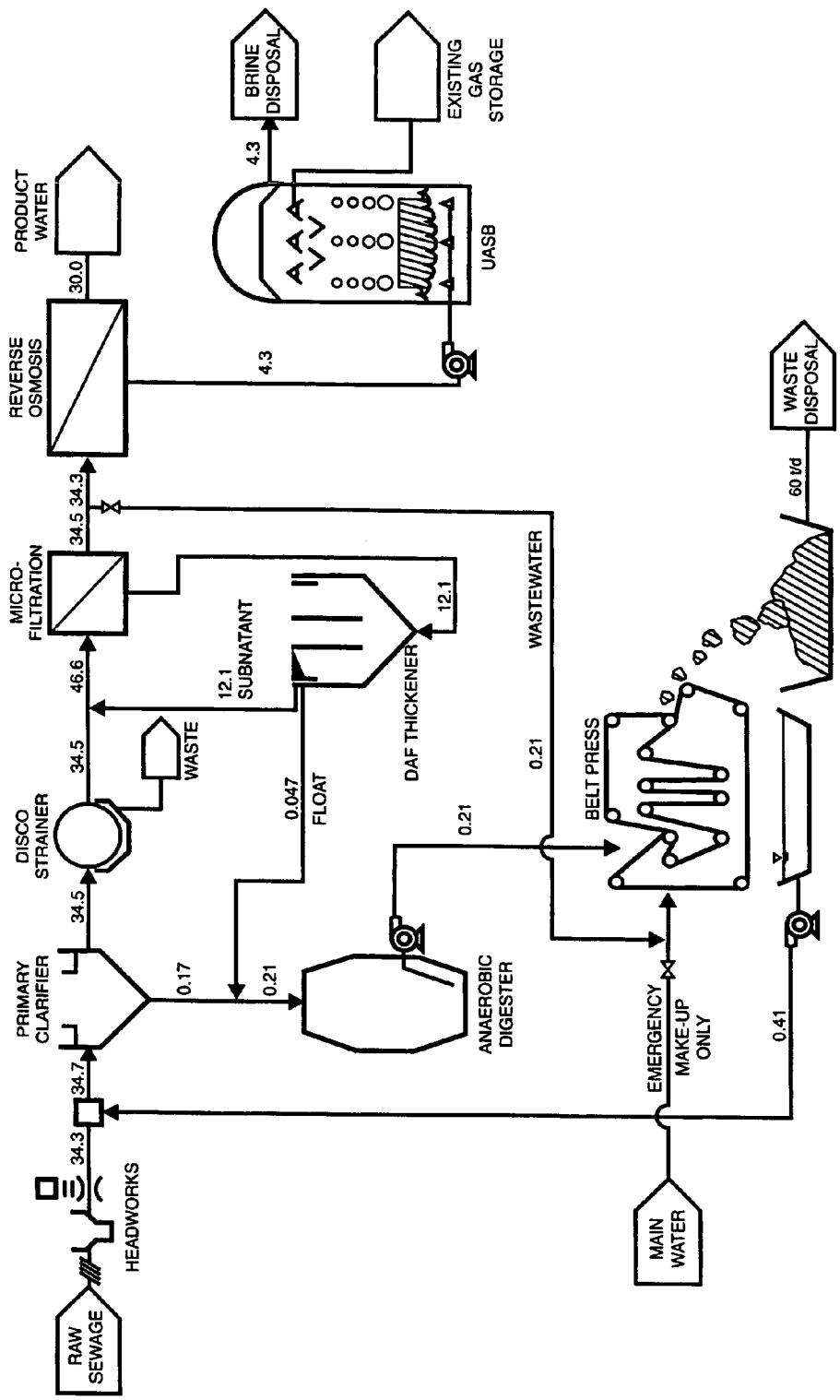
FIG. 4 is a flow diagram depicting the particular process used in the Example.

A pilot plant incorporating a method of the present invention was constructed and tested over several phases. FIG. 4 provides a detailed flow diagram of a full scale facility, about 50 mgd incorporating the components of the pilot plant. Each of the units in the pilot plant is described below.

1. Equipment Used a. Preliminary Treatment

In an initial phase of pilot testing, static screens with an opening of 3/64 inch (1,190 microns) were used in a dual mechanical strainer, Hayward Model 50 Duplex Strainer manufactured by Hayward Industrial Products of Elizabeth, N.J. Later, an automatic strainer, Hycor Discostrainer Unit Model DS 391 manufactured by Parkson Corporation of Lake Bluff, Ill. was installed to reduce manual operation and cleaning requirements associated with the static screens. The Hycor pilot unit had one pair of wire mesh covered discs with a wheel diameter of 39 inches. The unit is capable of using screen sizes from 75 to 600 microns. A screen with an opening of 600 microns was utilized in the pilot testing.

b. Microfiltration (MF)

Screened primary effluent was microfiltered using a Memcor 6M10C continuous microfiltration (QMF) unit, manufactured by United States Filter Corporation of Palm Desert, Calif. The CMF unit contained six modules operated in parallel and in a dead-end mode. Each module housed polypropylene membranes with a 0.2 micron nominal pore size arranged in an outside-in hollow fiber configuration. The external surface area of membranes available in each module was 370 ft$^2$ (34.6 m$^2$). However, during a portion of the pilot testing, only four out of six modules were operating in the CMF unit. After a period, one of the modules was repaired, resulting in five operating modules for the remaining period of the pilot testing.

Upstream from the CMF unit, the system was configured to provide variable dosages of chlorination to the strained primary effluent. Also, a manual control valve was placed downstream of the CMF unit for adjustably maintaining the product flow rate.

The CMF unit was configured for chemical cleaning and hydrodynamic cleaning. The chemical cleaning approach used was a dual wash scheme. The first wash was completed using citric acid (at a pH of 2.0), and the second wash was completed using a mixture of 40 percent caustic soda solution and a cleaning solution having a pH of 11, commercially available as Memclean solution, manufactured by United States Filter Corporation of Palm Desert, Calif. Product flow rate and feed and product stream pressures were recorded twice per operator shift. The membranes were hydrodynamically cleaned by the combined air backwash/ feed water flush system after every 12 minutes of operation. Each backwashing event generated approximately 80 gallons of waste that was collected in a holding tank and gravity-drained.

c. Reverse Osmosis (RO)

The RO unit was fitted with six pressure vessels, each containing three membrane elements (each 4 inches in diameter and 40 inches long) in a spiral wound configuration. The pressure vessels were arranged in four banks with a 2:2:1:1 configuration. In the initial phase of testing, Fluid Systems TFC 4821 ULP RO membranes, available through Koch Membrane Systems, Inc. of Wilmington, Mass., were used. Each had 80 ft$^2$ of membrane area, resulting in a total membrane area of 1,440 ft$^2$. In the later phase of pilot testing, new RO membranes, Hydranautics LFCI-4040, available through Hydranautics, Inc. of Oceanside, Calif. were used. The new RO membranes each had 85 ft$^2$ of membrane area, resulting in a total membrane area of 1,530 ft$^2$. The system was configured to add small amounts of both anti-scalant and sulfuric acid to the RO feed stream. The RO membrane was chemically cleaned using a mixture of sodium tripolyphosphate and sodium dodecylbenzene sulfonate at a temperature of 104° F. and a pH of 11. For the pilot test, the product stream from the RO unit was discharged to drain while the reject or concentrate stream was directed to the UASB pilot unit discussed below.

d. Upflow Anaerobic Sludge Bed (UASB)

The UASB unit received concentrate from the RO unit. The UASB reactor comprised a feed conditioning tank and an upflow fluidized bed reactor manufactured by Paques, B.V. of The Netherlands. The reactor contained palletized sludge that converted the organic matter in the feed stream to methane and carbon dioxide gases.

A manually-adjustable control valve was placed along the RO concentrate feed line to maintain a selected feed rate into the UASB feed conditioning tank. The recycle rate of the effluent stream from the UASB reactor to the feed conditioning tank was adjustable. A rotameter in the feed line indicated the feed rate to the UASB. Excess concentrate from the feed conditioning tank was discharged to drain. In an alternate method, this excess concentrate also can be recycled within the plant if desired. Feed pH was adjusted to be between the range of 7.8 to 8.5 by adding sodium hydroxide. A heater installed in the conditioning tank was used to adjust the temperature of the contents as necessary to around 37° C. The volume of the feed tank was adjustable to allow the hydraulic residence time to be varied from approximately 1 to 6 hours.

A pump injected the conditioned feed in the base of the UASB reactor. The reactor had a hydraulic volume of 66 gallons (250 L) and was constructed from a HDPE pipe Dn450 pn6 welded on a flat HDPE plate, within a stainless steel frame. The reactor was equipped with four ball-valve sample points and a drain valve. A proprietary BIOPAQ three-phase separator (or settler module) was located at the top of the reactor. The separator comprised a rectangular propylene box in which were fitted gas hoods divided over three levels, an effluent trough, and a biological gas collection compartment. The separator worked to separate any solids (biological pellets), the gas, and the reactor effluent. The gas phase was metered and then discharged to a foul air system.

2. Operation a. Preliminary Treatment

Prior to MF, primary effluent was pumped to the plant through an in-line stainless steel screen. This screening removed any "large" solid particles that may clog the membrane system.

b. Microfiltration

The MF process was initially tested without the addition of sodium hypochlorite to the screened primary effluent. In a subsequent phase, chlorination of MF feed water was performed, with chlorine dosages targeted to maintain a combined chlorine residual of 3.0 mg/L in the MF product water. When chlorination was carried out, sodium hypochlorite solution was dosed directly into the MF feed tank.

Screened primary effluent was then processed through the MF unit. This step typically removes almost all suspended solids and a large fraction of naturally-occurring bacteria, protozoa, and viruses in the wastewater. Throughout the testing, the MF unit was controlled so that the product flow rate was maintained at approximately the same value for extended periods of testing. Different product flow rates were tested as part of optimizing the system recovery and process operation. This was achieved by adjusting a manual flow control valve downstream of the modules.

A constant feed pressure was applied to the membranes by the feed pump. In this operation, the trans-membrane pressure (TMP) increases as the membranes foul. The TMP was expected to typically increase from an initial low level of about 5 psi. As the TMP increased, the product flow control valve was opened in order to maintain a given flow rate. The valve was adjusted by the operating staff twice per shift.

Constant-flux experiments were performed with a targeted product flow rate of approximately 15 gallons per minute (gpm), corresponding to a permeate flux of between 10 and 15 gallons per square foot per day (gfd).

Chemical cleaning of the membranes was performed when the TMP exceeded a target value of about 15 psi. This value was selected based on manufacturer recommendations. The cleaning operation required the MF unit to be taken off line for the duration of the cleaning. Different backwashing intervals were tested to optimize system operation.

The following specific test protocols were undertaken during the operation of the pilot plant in order to improve the performance of the MF unit:

Initial Operation-Initially the unit was operated without any chemical addition. This period of operation provided a baseline condition for the performance of the membranes.

Chlorination of the Feed Water-In previous studies of MF treatment of secondary wastewater, it has been shown that the presence of chloramines in the feed water assists in extending the period between chemical cleans. As a second step in the testing protocol, the primary effluent feed water to the MF unit was dosed with sodium hypochlorite. The MF membranes are not resistant to free chlorine, however they can tolerate the presence of chloramines and a concentration of 3 mg/L total chlorine in the product water was targeted. The target concentration was obtained by manually measuring the total chlorine residual in the MF product water and manually adjusting the dosage rate to the feed tank.

Operating Flux Value-The initial plan was to operate the MF unit at targeted product flow rates between 13 gpm to 20 gpm. This would equate to a range of permeate fluxes from 10.1 gfd to 15.6 gfd. Higher fluxes are expected to lead to more frequent chemical cleanings. The effect of the potentially more frequent chemical cleanings would be evaluated against the benefit of greater product production and overall recovery.

Backwash Frequency—The initial backwash frequency was set at 10 minutes. The frequency was adjusted to different values depending on the observed performance.

Table 1 lists the dates when the target recovery rate was changed by adjusting the permeate flow rate and/or the backwash interval. As shown, seven different recovery values were tested, between 70 and 78 percent. The adjustments to recovery at a particular point during the testing were made based on the performance results and sustainability of fluxes observed up to that point in the testing. Conditions 2 through 7 pertain to five operating modules, while Condition 1 pertains to four operating modules. Conditions 1, 6, and 7, have the highest targeted recoveries.

TABLE 1

Operational Changes Related to Adjustment of Recovery Rate

| No. | Backwash Interval (min) | Target Permeate Flow (gpm) | Target Permeate Flux (gfd) | Target Recovery (%) | Remarks |
|---|---|---|---|---|---|
| 1 | 12 | 15.4 | 15.0 | 77.6 | Manual Screen |
| 2 | 12 | 13 | 10.1 | 70.1 | Manual Screen |
| 3 | 12 | 17 | 13.2 | 75.4 | Manual Screen |
| 4 | 12 | 13 | 10.1 | 70.1 | Automatic Screen |
| 5 | 12 | 17 | 13.2 | 75.4 | Automatic Screen |
| 6 | 12 | 20 | 15.6 | 78.3 | Automatic Screen |
| 7 | 15 | 15 | 11.7 | 77.1 | Automatic Screen | c. Reverse Osmosis

The initial dosing rates for anti-scalant and acid were set based upon previous work treating secondary effluent and a detailed chemical analysis of the MF product stream. The RO plant was purposefully operated below its normal design capacity due to the production flow limitations of the MF pilot plant. The RO pilot was operated at a targeted feed flow rate of 10 gpm, and an overall recovery of 80 percent.

d. Upflow Anaerobic Sludge Bed (UASB)

Unlike MF and RO, anaerobic processes, being biological and slow growing systems, take a relatively long time to stabilize. For anaerobic processes, the unavoidable process interruptions that occur in a pilot plant can make continuous process operation and analysis complicated. Much of the early operation of the UASB pilot plant was an acclimation phase, during which RO concentrate was added in batches to the feed conditioning tank so interruptions in the operation of the MF and RO plants had less impact. The reactor product stream was entirely recycled to the feed tank during this period. The objective of the acclimation phase was to acclimate the pelletized sludge to the organic material in the RO concentration stream. Later, the RO concentrate was introduced continuously, and recycling was stopped. Continuous addition of the RO concentrate only occurred after the RO membranes had been replaced.

3. Operational Results a. MF i. Hydraulic Performance

Figure 5:
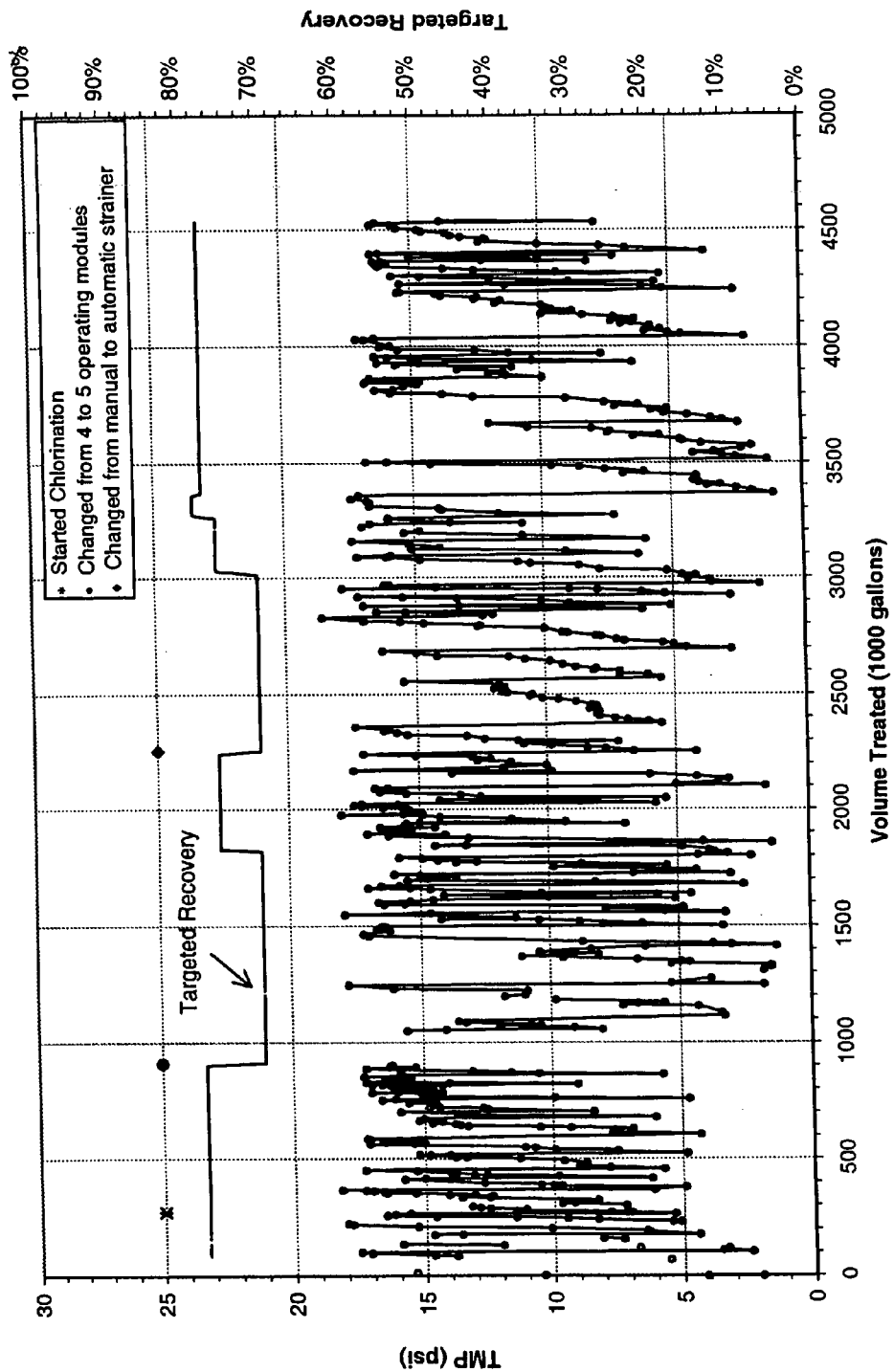
FIG. 5 is a graphical representation of the trans-membrane pressure of the MF unit during testing.

FIG. 5 illustrates the trans-membrane pressure of the MF unit during testing. The trans-membrane pressure (TMP) is calculated as the pressure difference between the feed and permeate sides of the membrane. It represents the driving force of differential pressure for the process. For constant permeate flux operation, the TMP increases over time as the membrane fouls. Both hydrodynamic cleaning (back flushing) and chemical cleaning are used to control the increase in TMP by removal of rejected materials from the membrane surface and/or substructure. While back flushing helps to mitigate short term fouling to some extent, over a longer time period the TMP continues to demonstrate an increasing trend. When the TMP reaches a maximum recommended value, a chemical cleaning is performed.

Figure 6:
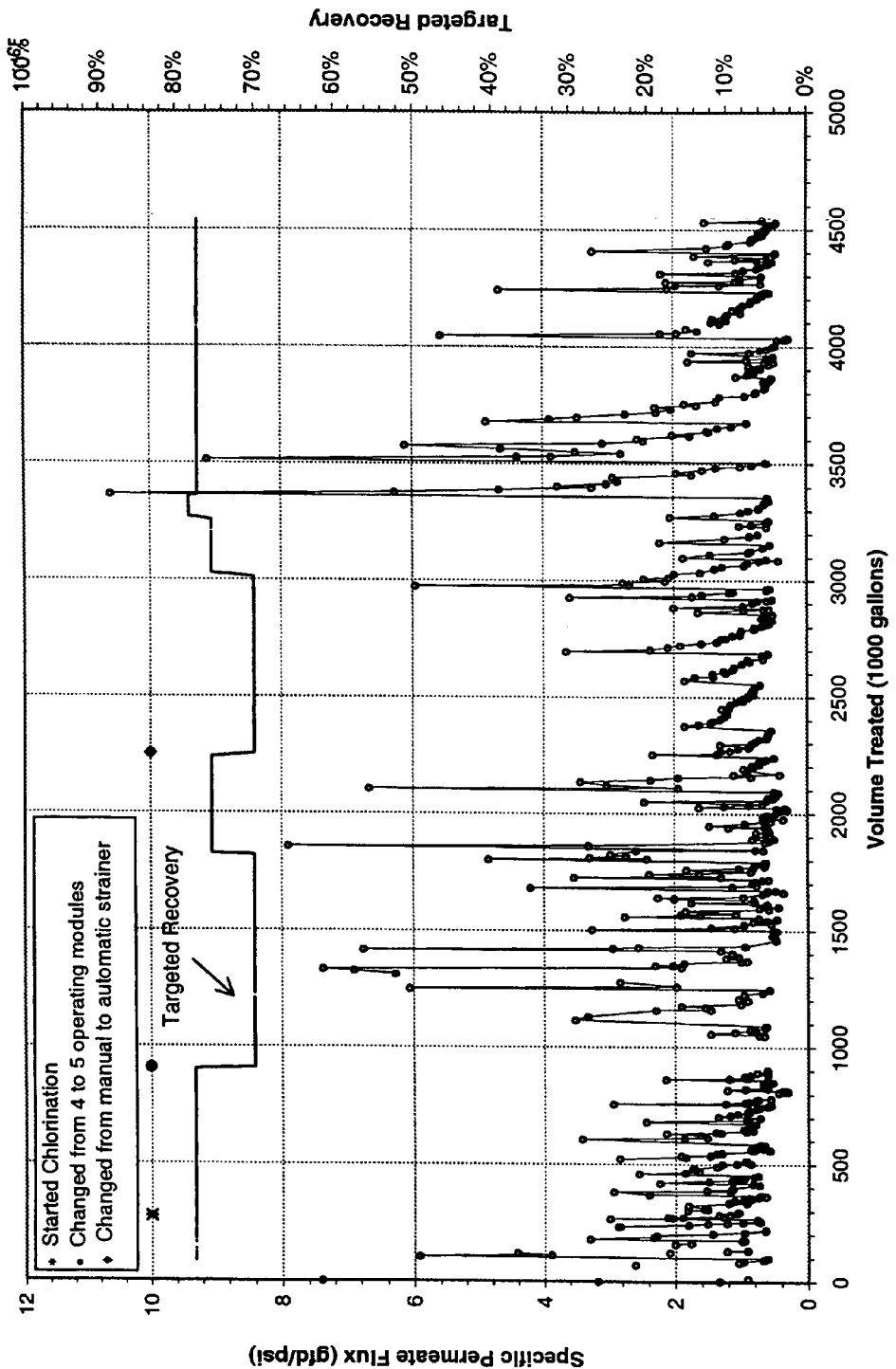
FIG. 6 is a graphical representation of the specific permeate flux of the MF unit during testing.

In the pilot runs performed, the TMP was allowed to reach a maximum of about 15 psi before performing chemical cleaning. It was found that in general it was possible to recover the TMP to low values (less than 5 psi) after chemical cleanings under the conditions tested. Thus, no long term irreversible fouling of the membranes over the wide range of operating conditions tested was observed. Specific permeate flux, permeate flux divided by the trans-membrane pressure, was relatively consistent throughout the operation of the pilot plant, also indicating that the membranes were not fouled significantly in an irreversible fashion. FIG. 6 illustrates the specific permeate flux of the MF unit during testing.

The amount of treated water produced between two chemical cleanings varied widely, from about 10,000 gallons treated to more than 200,000 gallons treated between washes.

The conditions from Table 1 produced varying hydraulic results. During Condition 1, the clean water production between chemical cleans averaged 45,420 gallons, calculated over 14 cleaning cycles. For Condition 7, the clean water production between chemical cleans averaged 90,713 gallons, calculated over 13 cleaning cycles. For comparison, for the entire operation of the pilot plant, the clean water produced between chemical cleans averaged 74,673 gallons over 57 cleaning cycles. Under conditions with five operating modules, the highest recovery was during Conditions 5, 6 and 7. However, Condition 6, with a permeate flow rate of 20 gpm, was not found to be sustainable due to the production limitations of the relatively small MF pilot and was tested for only about one week. The permeate flow rate of 20 gpm could not be achieved with the permeate valve fully open. The MF unit treated more that 1.5 million gallons of screened primary effluent over the testing period.

ii. Water Quality Analysis

Figure 7:
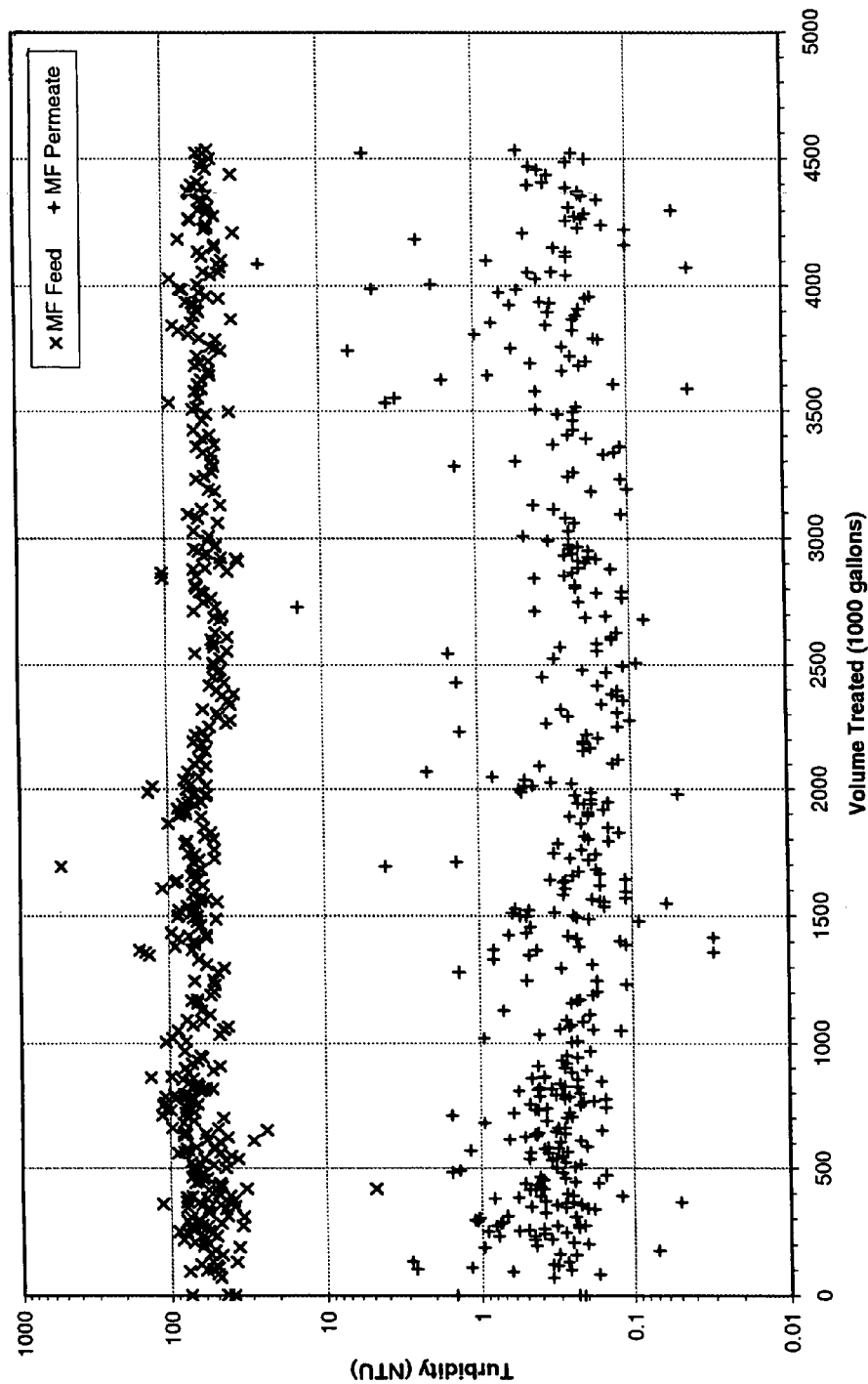
FIG. 7 is a graphical representation of the turbidity of the influent and effluent of the MF unit during testing.

MF performance in terms of key parameters analyzed in MF influent and effluent streams is reflected by the data presented in Table 2 and in FIG. 7. These data are averages based on multiple grab samples. The turbidity of the feed, product (permeate), and concentrate streams from the MF was also measured. The average turbidities in the MF feed, product, and concentrate streams were, 63.5 NTU, 0.52 NTU, and 340.2 NTU, respectively. Based on these averages, the turbidity removal by MF was 99.2 percent.

Bacterial removal was very effective as shown by the values reported in Table 2, which translate to up to 7 log removal of total coliform and fecal coliform and approximately 3 log removal of coliphage. Also, MF removed approximately 50% of both BOD and chemical oxygen demand (COD), and greater than 80% of total oil and grease. Reduction in total Kjeldahl hydrogen (TKN) in MF filtrate was mostly due to removal of the organic nitrogen component, while no significant change was observed in ammonia nitrogen concentrations, as expected.

TABLE 2

Water Quality Analysis of MF Influent and Effluent Streams

| Parameter | Units | MF Influent* | MF Effluent* |
|---|---|---|---|
| Total Suspended Solids (TSS) | mg/L | 38.8 (171) | <0.2–1.9 (158) |
| Biochemical Oxygen Demand (BOD5) | mg/L | 124.3 (124) | 64.8 (124) |
| Chemical Oxygen Demand (COD) | mg/L | 273.5 (123) | 138.4 (117) |
| Total Oil and Grease | mg/L | 22.1 (37) | 4.0 (34) |
| Total Coliform | MPN/100 m | >24,000,000 (45) | <1.1–3,000 (45) |
| Fecal Coliform | MPN/100 m | >24,000,000 (46) | <1.1–300 (46) |
| Coliphage | PFU/100 mL | 840,000 (32) | <10–5,500 (31) |
| Total Dissolved Solids (TDS) | mg/L | 1,227.5 (46) | 1,127.2 (114) |
| Total Kjeldahl Nitrogen (TKN) | mg/L | 32.5 (20) | 29.8 (11) |
| Orthophosphate | mg/L | 3.2 (30) | 2.7 (30) |
| Ammonia-N | mg/L | 23.0 (50) | 23.2 (47) |

*Average values reported with number of samples in parenthesis b. Operational Results of RO As described previously, two types of RO membranes were used in the pilot test. Initially, older membranes TFC 4821ULP manufactured by Fluid Systems designated as "Membranes A", were used. They were replaced by new membranes, Hydranautics LFCI-4040, designated as "Membranes B". The hydraulic performance of the RO pilot plant is discussed in terms of key parameters including observed salt rejection, feed pressure, normalized permeate flux, and frequency of chemical cleaning. The RO unit began operating about a month after the MF unit and was shut down at the completion of all testing.

i. Salt Rejection

Salt rejection by the RO membranes was determined from conductivity measurements. A standard salt rejection test determines the salt rejection of the membranes under "standard" conditions using a synthetic feed water. In this Example, a solution of sodium chloride was used. Five standard salt rejection tests were carried out during the test work. The standard salt test data indicates that Membranes A had relatively poor salt rejection characteristics, even at the start of the pilot tests. However, even with a low initial salt rejection capability, the older membranes were able to develop a "dynamic" membrane on the membrane surface and achieve an overall salt rejection of around 85 to 90 percent. After a chemical cleaning the initial salt rejection dropped to around 50 percent. But then, the performance improved and the salt rejection increased to around 85 to 90 percent again. Membranes B demonstrated rejection typically higher than 93 percent throughout the remaining test period.

TABLE 3

Rejection from Standard Salt Tests

| Test # | Membranes | Duration (days) | Rejection |
|---|---|---|---|
| 1 | A | 87 | 50% |
| 2 | A | 245 | 39.1% |
| 3 | B | 307 | 96.5% |
| 4 | B | 338 | 97.6% |
| 5 | B | 386 | 93.9% |

The salt rejection performance for all phases of operation with the new Membranes B showed steady salt rejection. Even in the case where the salt rejection was reduced to around 95 percent (at about 385 days), the performance was still consistent. During the early phases of operation with Membranes A there were a considerable number of plant shut downs due to the unavailability of MF product water. Thus, the older membranes were also subjected to many start/stop operating conditions and several days without operation, which could have hastened their deterioration.

ii. Feed Pressure

For Membranes A, the initial feed pressure was typically below 100 psi and then increased with time, whereas, Membranes B, being new, were "tighter" and the initial feed pressure was above 100 psi. The average feed pressure for Membranes A was 162 psi and Membrane B was 164 psi. Chemical cleanings were planned when the feed pressure exceeded 200 psi. Five chemical cleans were performed over the entire operating period of the RO pilot, indicating that membrane fouling was not significant and permeate fluxes were sustainable. After the new membranes were installed and almost continuous operation was achieved, chemical cleaning occurred approximately monthly which is similar to what is expected for RO systems treating secondary wastewater.

iii. Normalized Permeate Flux

The permeate flux for the RO unit, normalized to a temperature of 25° C., averaged 8.5 gfd for Membranes A and 8.5 gfd for Membranes B. However, it is expected that higher permeate fluxes should be possible. The RO plant was operated below its normal design capacity in order to correspond with the flow received from the MF unit. Therefore, higher permeate fluxes and recoveries could not be tested. However, due to the fact that excessive fouling of the membranes was not observed, it is expected that higher permeate fluxes and recoveries should be possible.

iv. Water Quality Results

Tables 4 and 5 summarize the water quality data measured and analyzed for the old (Membrane A) and new (Membrane B) RO membrane respectively.

TABLE 4

Water Quality Analysis of RO Influent and Effluent Streams-Membrane A

| Parameter | Units | RO Feed* | RO Product* |
|---|---|---|---|
| Total Coliform | CFU | 2,410 (17) | <200–43,000 (18) |
| Fecal Coliform | CFU | <1–130 (17) | <1–2 (18) |
| HPC | CFU | 720–3,400,000 (16) | 5–78,000 (18) |
| TDS | mg/L | 1,086 (17) | 138.4 (18) |
| Ba | ug/L | 37.1 (17) | 2.4 (18) |

TABLE 4-continued

Water Quality Analysis of RO Influent and
Effluent Streams-Membrane A

| Parameter | Units | RO Feed* | RO Product* |
|---|---|---|---|
| Ca | mg/L | 67.5 (17) | 2.7 (18) |
| $SO_4$ | mg/L | 269.6 (17) | 9.4 (18) |
| TOC | mg/L | 43.7 (17) | 5.7 (18) |
| $NH_3$-N | mg/L | 20.1 (17) | 4.1 (18) |
| Org-N | mg/L | 4.1 (17) | 0.6 (18) |
| TKN | mg/L | 24.2 (17) | 4.7 (18) |
| Total Alkalinity | mg/L | 269 (17) | 62 (18) |

*Average values reported with number of samples in parenthesis

TABLE 5

Water Quality Analysis RO Influent and
Effluent Streams-Membrane B

| Parameter | Units | RO Feed* | RO Product* |
|---|---|---|---|
| Total Coliform | CFU | 338,941 (18) | 8,585.6 (15) |
| Fecal Coliform | CFU | 13 (11) | <1 (10) |
| HPC | CFU | 1,283,571 (8) | 9,322 (9) |
| TDS | mg/L | 1,069.4 (10) | 24.3 (10) |
| Ba | ug/L | 44.8 (9) | <1 (9) |
| Ca | mg/L | 73.2 (9) | 0.4 (10) |
| $SO_4$ | mg/L | 232.6 (10) | 3.2 (10) |
| TOC | mg/L | 41.8 (17) | 1.8 (10) |
| $NH_3$-N | mg/L | 19.5 (10) | 1.3 (10) |
| Org-N | mg/L | 4.1 (17) | 0.3 (10) |
| TKN | mg/L | 23.6 (10) | 1.6 (10) |
| Total Alkalinity | mg/L | 286 (17) | 31.9 (10) |

*Average values reported with number of sample in parenthesis

Microbial removal was tested by analyzing total coliform, fecal coliform, and (HPC), in the RO feed and product streams. The values in Tables 4 and 5 indicate that on the product side of the membrane some coliform bacteria were growing. This is confirmed by the presence of HPC bacteria in the product water as well. However, the removal of fecal coliform was good. As shown below, similar results were obtained for Membranes B, although the total coliform and HPC values in the Product water were lower. Membranes B demonstrated a significantly higher TDS removal compared to Membranes A, with average removals at 97.7 percent and 87.1 percent, respectively.

The variation of total organic carbon (TOC) concentrations in the RO feed and permeate for Membranes A and B were observed. Membranes B were able to achieve and average TOC removal of about 96 percent, with an average product water TOC concentration of 1.8 mg/L. By comparison, Membranes A were only able to produce an average product water TOC of 5.7 mg/L.

Membrane B demonstrated approximately 99 percent removal for calcium, sulfate, and barium concentrations. Membrane B further demonstrated about 93 percent removal for Ammonia nitrogen, organic nitrogen and total kjeldahl nitrogen concentrations. Alkalinity was reduced by about 89 percent in the case of Membrane B. The product produced by both membranes could require stabilization, to increase the calcium concentration, prior to final use. The need for stabilization would depend on the final use for the product water. Overall, the older membranes (A) preformed more like nanofiltration membranes rather than RO membranes.

c. Operational Results of UASB

Overall, it was not possible to achieve uninterrupted testing durations for anaerobic UASB process. Thus, performance results and analysis detailed in the following paragraphs should be interpreted as an initial, limited, and interrupted operation of the UASB operation. It is expected that a more stable and long-term operation of the UASB would result in improved performance.

The hydraulic performance of the UASB pilot is discussed in terms of key parameters including the cumulative gas production and the gas production rate with respect to various operating parameters. The acclimation phase can be considered as approximately the first 255 days of operation. During this period, the pilot unit was operated in full recycle mode and at a feed flow rate of 3.78 L/min, the hydraulic retention time reactor was about 1 hour. Nothing happened initially, possibly because during the early phases of the work, the organic load was too low for gas production.

In one phase of the test, sugar was added to increase the COD of the condition tank by 60 mg/L. Gas production began to increase and laboratory COD analysis confirmed that COD consumption was occurring in the UASB. At the same time more RO brine was added to the feed conditioning tank. It was observed that adding RO brine increased the COD significantly more than the small amount of sugar that was added. Increases in COD corresponded to the addition of additional RO concentrate, confirmed that COD from the RO concentrate was consumed by the UASB reactor.

The increase in temperature of the feed stream from between 20 and 25° C. to 37° C. had only a marginal impact on the gas production. One of the parameters of concern in the RO concentrate stream was TDS, and in particular sulfate. The UASB pelletized sludge was accustomed to high concentrations of COD, but not TDS or sulfate. Tables 4 and 5 showed that the TDS of the RO concentrate averaged 4,680 mg/L when the older membranes (Membranes A) were in operation.

The TDS in the UASB feed tank increased during the acclimation phase of the operation. By the time the RO pilot plant had been fitted with new membranes, the feed solution being circulated through the UASB pellets had a TDS of about 2,500 mg/L, and the sulfate concentration had reached about 500 mg/L. At this point, the sulfate concentration was at times double that of the COD concentration. However, no hydrogen sulfide gas was detected. Over a period of about two weeks the TDS in the feed tank increased further, closer to the RO concentrate concentration of about 5,000 mg/L (corresponding to the concentrate produced by the new RO membranes (B)).

On about day 255 of operation, on the recommendations of the UASB manufacturers (Paques ADI, Inc.) the feed flow rate to the UASB reactor was reduced to 0.5 L/min and the unit was put into "once-through" operation. These changes increased the hydraulic retention time in the UASB reactor from around 1 hour to about 8 hours, and stopped the recycle operation, so that the reactor was being fed RO concentrate only. At the same time, additional pelletized sludge was added to the reactor to increase the sludge volume form about one-third to about two-thirds. The sludge that was added to the reactor was pelletized sludge from a UASB reactor treating brewery effluent. After about 10 days of operation at the new hydraulic condition, the gas production increased dramatically. For two weeks, the gas production rate was sustained at a consistent high rate. During this period the sulfate concentration in the feed stream was around 1,000 mg/L while the COD concentration was around 600 mg/L.

ii. Gas Composition

Gas composition measurements were taken during the two week period of gas production are shown in Table 6 below. Methane comprised the dominant portion at an average of 66 percent. This confirms that methanogenesis was occurring in the anaerobic UASB process. The nitrogen concentration in the biological gas was initially attributed to the sampling method used. Samples were collected in gas bags that are porous to nitrogen from the atmosphere. However, samples were also collected in glass syringes that are airtight. These samples also had high concentrations of nitrogen in them. The source of nitrogen was not explained. Also, despite the fact that there was a high concentration of sulfate in the feed water, no hydrogen sulfide gas was ever detected in the biological gas.

TABLE 6

Composition of Gas Generated from UASB Process

| Sample | Methane % | Carbon Dioxide % | Nitrogen % | Oxygen % |
|---|---|---|---|---|
| 1 | 70.00 | 2.20 | 26.60 | 1.20 |
| 2 | 70.30 | 2.50 | 25.48 | 1.73 |
| 3 | 62.40 | 2.00 | 31.73 | 3.90 |
| 4 | 62.40 | 2.00 | 31.73 | 3.90 |
| Average | 66.27 | 2.18 | 28.88 | 2.68 | iii. Water Quality Results

Water quality data measured and analyzed for the UASB pilot are summarized in Table 7. In a full-scale plant, the UASB product stream would be discharged to a "brine disposal" system. COD concentrations during the acclimation phase are low due to the batch additions of RO brine.

The total suspended solids (TSS) concentration in the effluent stream from the UASB reactor during the continuous operation phase typically were below 50 mg/L. Little variation of the pH of the UASB feed tank contents was observed.

TABLE 7

Summary of Water Quality Data for UASB Pilot

| Parameter | Units | RO Concentrate* | UASB Influent* | UASB Effluent* |
|---|---|---|---|---|
| COD | mg/L | 678.4 (73) | 326.4 (70) | 262.4 (116) |
| BOD$_5$ | mg/L | 360.9 (74) | 97 (72) | 65.6 (119) |
| Sulfate | mg/L | 1,314.3 (23) | 721 (40) | 564.6 (59) |
| Sulfide | mg/L | <0.1 (22) | <0.1–7.7 (22) | <0.1–90 (39) |
| NH$_3$ | mg/L | | <1–122 (24) | <1–135 (24) |
| TDS | mg/L | | 2,756.3 (24) | 2703.9 (23) |
| TSS | mg/L | | 64.8 (23) | 43.4 (22) |

*Average values reported with number of samples in parenthesis

4. Capital Cost Savings

Preliminary cost estimates are shown in Table 8 below. They compare the estimated cost of a full-scale treatment and reclamation facility of a preferred method with that of a conventional plant, consisting of full secondary treatment followed by the "add-on" processes of MF and RO.

The effect of variations in key operating parameters on the operations and maintenance (O&M) costs for the MF plant based upon the Conditions designated in Table 1 were explored. For all simulations, RO recovery was held constant at 87.5 percent. The different operating conditions resulted in different fluxes, recoveries and chemical cleaning frequencies (as determined by the reciprocal of the "product per wash" values). The impact of the different operating conditions is reflected in the total O&M cost. Overall, the benefits of operating at a higher flux (Condition 5) do not result in much of an O&M cost saving, because the membrane cleaning frequency increases. Moving to the highest flux condition (Condition 1) actually increases the O&M costs because of increased chemical cleaning costs.

To obtain an estimate of the total project cost, the capital costs presented in Table 8 were amortized over 20 years at a fixed annual interest rate of 6 percent. The resulting annual cost of the capital sum was then added to the annual O&M costs to give a total project cost.

TABLE 8

Total Project Costs ($1,000/yr)

| Cost | Prior Art Approach | Condition 1 | Condition 5 | Condition 7 |
|---|---|---|---|---|
| O&M | $9,385 | $8,398 | $8,186 | $8,307 |
| Capital | $17,854 | $15,930 | $16,700 | $17,508 |
| Total | $27,239 | $24,328 | $24,886 | $25,815 |

Overall, all conditions were found have a lower annual cost than a treatment plant using the prior art "add-on" approach. The cost savings varied between $1.4 million and $2.9 million, depending upon the MF operating configuration chosen.

It should be appreciated from the foregoing description that the present invention provides a method of treating wastewater that provides increased efficiency, leading to increased production of reclaimed water for lower cost. The method of the present invention provides stable hydraulic operation, with effective removal of solids and bacteria, and it is well-suited for treating both commercial and industrial wastewater.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for treating wastewater, comprising:
   treating wastewater to produce an effluent suitable for membrane filtration, the treating incorporating processes substantially free of aerobic biological treatment;
   treating the effluent using a membrane filtration system to produce a permeate stream consisting essentially of refined water and a waste stream comprising soluble organic matter and inorganic salts; and
   routing said waste stream through an anaerobic digestion process to stabilize the soluble organic matter and produce a biological gas, said biological gas comprising methane.

2. The method as in claim 1 wherein the step of treating the wastewater to produce an effluent suitable for membrane filtration includes providing primary treatment of the wastewater.

3. The method as in claim 2 wherein the step of providing primary treatment of the wastewater includes settling of the wastewater to remove bulk solids from the wastewater and addition of chemicals to aid solids removal.

4. The method as in claim 2 wherein the step of providing primary treatment of the wastewater includes screening of the wastewater to remove bulk solids from the wastewater wherein said screening size range is approximately 10 to 1,000 microns.

5. The method as in claim 1 wherein said membrane filtration system is selected from the group consisting of a microfiltration system, an ultrafiltration system, a nanofiltration system, a reverse osmosis system, or combinations thereof.

6. The method as in claim 1 wherein said high-rate anaerobic digestion process is an up flow anaerobic sludge blanket system.

7. The method as in claim 1 further comprising the step of routing a solids stream from said membrane filtration system to a solids thickening element.

8. The method as in claim 7 further comprising the step of recycling a recycle stream from said solids thickening element to a pretreatment system and routing a solids stream for anaerobic digestion.

9. A method for treating wastewater comprising:
   directing the wastewater through a screening apparatus to remove suspended solids from the wastewater, to produce a screened effluent;
   directing the screened effluent through a microfiltration system to produce a microfiltration effluent;
   directing the microfiltration effluent through a membrane system selected from the group consisting of a reverse osmosis system, a nanofiltration system, an ultrafiltration system, and combinations thereof, to produce a permeate stream consisting essentially of refined water and a waste stream comprising soluble organic matter and inorganic salts; and
   routing the waste stream through an up flow anaerobic sludge blanket system to stabilize the soluble organic matter and produce biological gas, the biological gas comprising methane.

10. A system for treating a wastewater stream comprising:
    a pretreatment system substantially free of aerobic biological treatment in communication with a wastewater influent;
    a screen element in communication with said pretreatment system wherein said screen element having apertures formed therein with a size range of approximately 10 to 1,000 microns;
    a primary membrane element in communication with said screen element;
    a secondary membrane element in communication with said primary membrane element wherein said secondary membrane having an effluent stream output and a concentrate effluent stream output; and
    a solids thickening element in communication with said primary membrane element and communicating a thickened solids stream to an anaerobic digestion process.

11. The system as in claim 10 wherein said primary membrane element is a microfiltration process having a filter pore size of approximately 0.03 to 0.3 microns.

12. The system as in claim 10 wherein an anaerobic digestion system is in communication with said secondary membrane element for receipt of said concentrate effluent stream output and said anaerobic digestion system having a methane gas output and a digestion system fluid effluent.

13. The system as in claim 10 wherein said solids thickening element is in communication with said pretreatment system for communication of a recycle stream.

14. The system as in claim 10 wherein a separation process is in communication with said secondary membrane element for receipt of said concentrate effluent stream into a separation stream and a disposal stream.

15. The system as in claim 14 wherein said separation process is an evaporation process.

16. The system as in claim 10 wherein said thickened solids stream having a thickened solids content of approximately 2.5 to 5.0 percent solids.

17. The system as in claim 10 wherein a permeate stream from said primary membrane element is routed to the ocean.

* * * * *